(12) United States Patent
Falconetti et al.

(10) Patent No.: US 9,210,584 B2
(45) Date of Patent: Dec. 8, 2015

(54) MEASURING SIGNAL INTERFERENCE USING USER EQUIPMENT MEASUREMENTS

(75) Inventors: Laetitia Falconetti, Aachen (DE); Gabor Fodor, Hasselby (SE); Jörg Huschke, Aachen (DE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 13/989,864

(22) PCT Filed: Nov. 29, 2010

(86) PCT No.: PCT/EP2010/068437
§ 371 (c)(1),
(2), (4) Date: May 28, 2013

(87) PCT Pub. No.: WO2012/072101
PCT Pub. Date: Jun. 7, 2012

(65) Prior Publication Data
US 2014/0112403 A1    Apr. 24, 2014

(51) Int. Cl.
*H04K 1/10* (2006.01)
*H04W 16/28* (2009.01)
(Continued)

(52) U.S. Cl.
CPC .............. *H04W 16/28* (2013.01); *H04B 17/24* (2015.01); *H04B 17/345* (2015.01);
(Continued)

(58) Field of Classification Search
CPC ..... H04W 16/28; H04W 24/10; H04W 52/24; H04B 7/0617; H04B 7/0408; H04B 7/0695; H01Q 1/246; H01Q 25/00; H01Q 3/2605

USPC .......... 375/260, 262, 265, 267, 340, 343, 346
See application file for complete search history.

(56) References Cited

U.S. PATENT DOCUMENTS 8,611,823 B2 * 12/2013 Weng et al. ................... 455/63.1
9,026,164 B2 *  5/2015 Gorokhov et al. ............ 455/522
(Continued)

FOREIGN PATENT DOCUMENTS

EP     2129173 A1    12/2009
WO  2010/106556 A2    9/2010

OTHER PUBLICATIONS

International Search Report for PCT/EP2010/068437, mailed Sep. 2, 2011, 5 pages.
(Continued)

*Primary Examiner* — Dhaval Patel
(74) *Attorney, Agent, or Firm* — Withrow & Terranova, PLLC

(57) ABSTRACT

The invention relates to a method for measuring signal interference from an interfering transceiver node of a mobile communications network to a user equipment served by a serving transceiver node. The interfering transceiver node uses a plurality of defined radiation patterns for signal transmission, wherein a transmission of a sequence of the defined radiation patterns by the interfering transceiver node is triggered. Furthermore, signal measurements of the signal transmitted by the interfering transceiver node that uses the sequence of the defined radiation patterns are triggered at the user equipment and an interference level of the signals received at the user equipment is estimated from the interfering transceiver node in dependence on the sequence of the defined radiation patterns, wherein the interference level is estimated based on the triggered signal measurements received from the user equipment.

21 Claims, 7 Drawing Sheets

(51) Int. Cl.
    H04L 5/00      (2006.01)
    H04B 17/24     (2015.01)
    H04B 17/345    (2015.01)
    H04B 17/382    (2015.01)
    H04W 24/08     (2009.01)
    H04L 27/26     (2006.01)
    H04W 28/04     (2009.01)

(52) U.S. Cl.
    CPC ........... H04B 17/382 (2015.01); H04L 5/0035 (2013.01); H04L 5/0073 (2013.01); *H04L 27/2601* (2013.01); *H04W 24/08* (2013.01); *H04W 28/048* (2013.01)

(56) References Cited

U.S. PATENT DOCUMENTS

2010/0054196 A1  3/2010  Hui

2014/0029507 A1*  1/2014  Dimou et al. ............... 370/315

OTHER PUBLICATIONS

"Evolved Universal Terrestrial Radio Access (E-UTRA); Further Advancements for E-UTRA Physical Layer Aspects," 3rd Generation Partnership Project, Technical Specification Group Radio Access Network, 3GPP TR 36.814, V9.0.0, Mar. 2010, 104 pages.

"Evolved Universal Terrestrial Radio Access (E-UTRA); Physical Channels and Modulation," 3rd Generation Partnership Project; Technical Specification Group Radio Access Network; 3GPP TS 36.211 V9.1.0, Mar. 2010, 85 pages.

"Evolved Universal Terrestrial Radio Access (E-UTRA); Physical layer; Measurements," 3rd Generation Partnership Project; Technical Specification Group Radio Access Network; 3GPP TS 36.214 V9.2.0, Jun. 2010, 14 pages.

International Preliminary Report on Patentability for PCT/EP2010/068437, mailed Jun. 13, 2013, 14 pages.

* cited by examiner

MEASURING SIGNAL INTERFERENCE USING USER EQUIPMENT MEASUREMENTS

This application is a 35 USC 371 national phase filing of International Application No. PCT/EP2010/068437, filed Nov. 29, 2010, the disclosure of which is incorporated herein by reference in its entirety.

TECHNICAL FIELD

The present invention relates to a method for measuring signal interference from an interfering transceiver node of a mobile communications network to a user equipment served by a serving transceiver node, to the serving transceiver node, to the interfering transceiver node and to a method for transmitting signals from the interfering transceiver node.

BACKGROUND

Due to transmit power limitations in mobile user equipments, the need for higher through-puts in future telecommunication networks, especially near the cell edge, combined with the constraint on the uplink link budget will necessitate the introduction of smaller cell sizes compared to cell sizes typically deployed in present cellular systems. The use of smaller cell sizes (pico cells) can be deployed in different carrier frequencies or can be overlaid in the same carrier frequency as the larger cells (macro cells). New interference scenarios appear with heterogeneous deployments in which small cells, the pico cells, and large cells, the macro cells, may use the same carrier frequency. This is primarily due to the large imbalance between the transmit (Tx) power of macro and pico base stations (BSs) and the applied cell association method that defines the base station that is responsible for a particular user i.e. serving base station serving a particular user equipment.

A known cell association mechanism is based on Reference Signal Received Power (RSRP) measurement from the user equipment (UE). RSRP is dependent on the transmit power of the base station. In the case of heterogeneous deployment with macro and pico cells as discussed above, the RSRP-based cell association leads to suboptimal performance in the uplink (UL). A user equipment may measure a higher RSRP from the macro base station although it is located closer to the pico base station, i.e. its pathloss to the pico base station is smaller than the pathloss to the macro base station. In an uplink, a cell association based on pathloss may be used.

If the cell association is modified to extend the area where the pico base station is a serving base station, a new interference scenario exists in the downlink (DL) direction. Macro base stations keep their transmit power and thus cause strong downlink interference to user equipments served by a pico base station but located close to the RSRP coverage area.

Similar or opposite interference problems exist in other configurations of heterogeneous deployment. User equipment served by a macro base station may also be strongly influenced by a pico base station in the downlink, if it is close to the pico base station but its access is restricted to a group of subscribed users.

One way to reduce downlink interference perceived by a user equipment is to apply codebook-based coordinated beam forming. In multiple antenna systems base stations weight their downlink signal with a precoding matrix before transmission. With coordinated beam forming, a base station uses a certain precoding matrix for which the received signal strength at a certain user equipment (in an adjacent cell) is low. In codebook-based coordinated beam forming a base station selects from a predefined codebook the precoding matrix for which the interference level perceived at a certain user is minimum.

In coordinated beam forming, the precoding matrix computation at a base station requires certain knowledge of the channel from the base station to the user to protect from interference. In time division duplex (TDD) systems, explicit downlink channel knowledge at base stations can be assumed due to channel reciprocity of the uplink and downlink channel.

In frequency division duplex (FDD) systems, however, base stations cannot estimate downlink channel coefficients alone. Since feedback from user equipments is needed to acquire channel knowledge at base stations in FDD systems, implicit downlink channel knowledge at the base station is the more practicable solution to apply coordinated beam forming. In this case a codebook of precoding matrices is defined as known from 3GPP TS 36.211, Evolved Universal Terrestrial Radio Access (E-UTRA); Physical channels and modulation. Each precoding matrix is addressable with its index within the predefined codebook. User equipments only report the index of the precoding matrix which is more suitable for a certain purpose, e.g. for maximizing or minimizing the received signal strength.

The problem with existing codebook-based coordinated beam forming for FDD systems is the need for additional user equipment feedback. This UE feedback, however, complicates the beam forming and leads to additional signaling.

SUMMARY

Accordingly, a need exists to determine the interference of an interfering base station/transceiver node in an effective way.

This need is met by the features of the independent claims. In the dependent claims further embodiments of the invention are described.

According to a first aspect of the invention, a method for measuring signal interference from an interfering transceiver node of a mobile communications network to user equipment served by a serving transceiver node is provided. The interfering transceiver node uses a plurality of defined radiation patterns for signal transmission. According to one step of the method a transmission of a sequence of the defined radiation patterns by the interfering node is triggered by the serving transceiver node. Additionally signal measurements at the user equipment of the signal transmitted by the interfering transceiver node that uses the sequence of the defined radiation patterns is triggered. In another step an interference level of the signals received at the user equipment from the interfering transceiver node is estimated in dependence on the sequence of the defined radiation patterns. The interference level is estimated using the triggered signal measurements received from the user equipment. With these steps it is possible to estimate the interference level received at the user equipment. The serving base station can associate the received signal measurements received from the user equipment with the defined radiation patterns used by the interfering transceiver node for signal transmission. Thus, the serving base station can determine in dependence on the radiation patterns used by the interference node which radiation patterns lead to high signal interference and which radiation patterns lead to low signal interference at the user equipment.

In one embodiment, the serving transceiver node may transmit a cooperation request to the interfering transceiver node indicating radiation patterns selected based on the above mentioned estimating step. The cooperation request may contain information about radiation patterns allowing the interfering transceiver node a signal transmission with reduced interference at the user equipment. In this embodiment, the signal measurements by the user equipment received at the serving transceiver node can be used to inform the interfering transceiver node which radiation patterns should be used in order to obtain reduced interference at the user equipment.

According to another aspect of the invention, a serving transceiver node of the mobile communications network is provided which serves a user equipment experiencing interference from the interfering transceiver node, wherein the interfering transceiver node uses a plurality of defined radiation patterns for signal transmission. The serving transceiver node comprises a first controller triggering a transmission of a sequence of the defined radiation patterns by the interfering transceiver node. The serving transceiver node furthermore comprises a second controller triggering signal measurements at the user equipment of the signal transmitted by the interfering transceiver node which uses the sequence of the defined radiation patterns. Furthermore, an interference estimator is provided estimating an interference level of the signals received at the user equipment from the interfering transceiver node in dependence on the sequence of the defined radiation patterns, the interference estimator using the triggered signal measurements received from the user equipment. The serving transceiver node can thus determine an interference level of the signals received at the user equipment as the serving transceiver node triggers the transmission of the sequence of defined radiation patterns transmitted by the interfering transceiver node taking into account the triggered signal measurements received from the user equipment. The serving transceiver node is then able to determine which of the defined radiation patterns results in high or low signal interference at the user equipment.

Furthermore, it is possible that the serving transceiver node may use this information to transmit a cooperation request to the interfering transceiver node. The serving transceiver node may contain a transceiver transmitting the cooperation request to the interfering transceiver node containing information about the radiation patterns allowing the transceiver node a signal transmission with a reduced interference level at the user equipment.

The invention furthermore relates to a method for transmitting signals from an interfering transceiver node of a mobile communications network to a user equipment served by the serving transceiver node, the interfering transceiver node using the plurality of defined radiation patterns for signal transmission. According to one step of the method, a request for transmitting a sequence of defined radiation patterns is received at the interfering transceiver node. The interfering transceiver node then transmits signals using the sequence of the defined radiation patterns contained in the request.

The invention furthermore relates to the interfering transceiver node of the mobile communications network transmitting signals to the user equipment served by a serving transceiver node. The interfering transceiver node can contain at least one antenna transmitting defined radiation patterns and a first controller receiving a request from the serving transceiver node for transmitting a sequence of the defined radiation patterns. The transceiver node contains a transmitter using at least one antenna configured to transmit signals having the defined radiation patterns. By using the defined radiation patterns received from the serving transceiver node, the interfering transceiver node supports the serving transceiver node in determining the radiation pattern dependent on the interference level at the user equipment e.g. the radiation patterns with low interference level at the user equipment.

In one embodiment the interfering transceiver node may contain a receiver receiving the cooperation request from the serving transceiver node containing information about radiation patterns allowing the interfering transceiver node a signal transmission with reduced interference at the user equipment. The interfering transceiver node can then follow the cooperation request or not. If the cooperation request is followed, the interference level at the user equipment can be reduced, as the interfering transceiver node can use radiation patterns generating less interference at the user equipment.

BRIEF DESCRIPTION OF THE DRAWINGS

The invention will be described in further detail with reference to the accompanying drawings, in which.

DETAILED DESCRIPTION OF EMBODIMENTS

Figure 1:
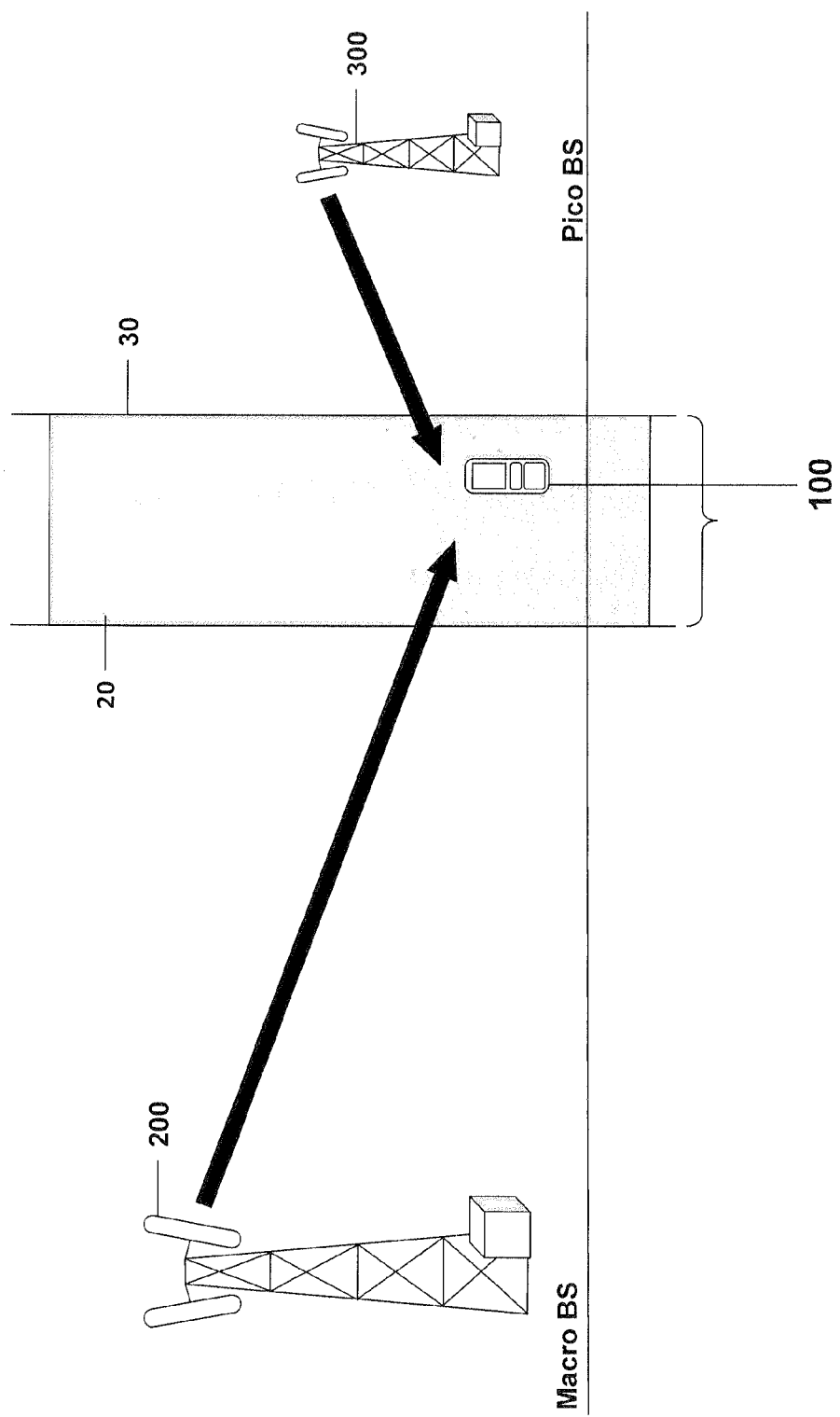
FIG. 1 shows a scenario in which interference problems at a user equipment may occur.

In the following it is explained in more detail how a serving transceiver node serving a user equipment can estimate an interference level at a user equipment, the user equipment receiving signals from the serving transceiver node and the interfering transceiver node. In FIG. 1 a situation is shown where a user equipment or a mobile phone 100 is served by a serving transceiver node 300, which, in the example shown, is a pico base station. The user equipment 100 furthermore receives signals from an interfering transceiver node 200 which, in the example shown, is a macro base station. The user equipment measures a high reference signal received power RSRP from the macro base station, although it is located close to the pico base station. One cell association mechanism is based on RSRP measurements from the user equipment. In the example shown, the user equipment may measure a higher RSRP from the macro base station although it is located closer to the pico base station, meaning that the pathloss to the pico base station is smaller than the pathloss to the macro base station. In the uplink direction, a cell association based on pathloss may be preferably used.

A mechanism enabling the extension of the area where the pico base station 300 is the serving base station is called Range Extension (RE) based cell association and can be seen as a compromise between the pathloss-based and the RSRP-based cell association. If the cell association is modified to extend the area where the pico base station 300 is a serving base station, a new interference scenario exists in the downlink. Both cells use the same carrier frequency and the macro base station 200 keeps its transmit power and thus causes strong downlink interference to user equipments served by the pico base station 300 but located close to the coverage area as defined by RSRP measurements. Reference numeral 20 shows the cell border for the range-extension-based cell association whereas reference numeral 30 shows the cell border for the RSRP-based cell association.

Corresponding interference problems exist in other configurations of the heterogeneous deployment. For example, a user equipment served by the macro base station may also be strongly interfered with by a pico base station 300 in the downlink.

Figure 2:
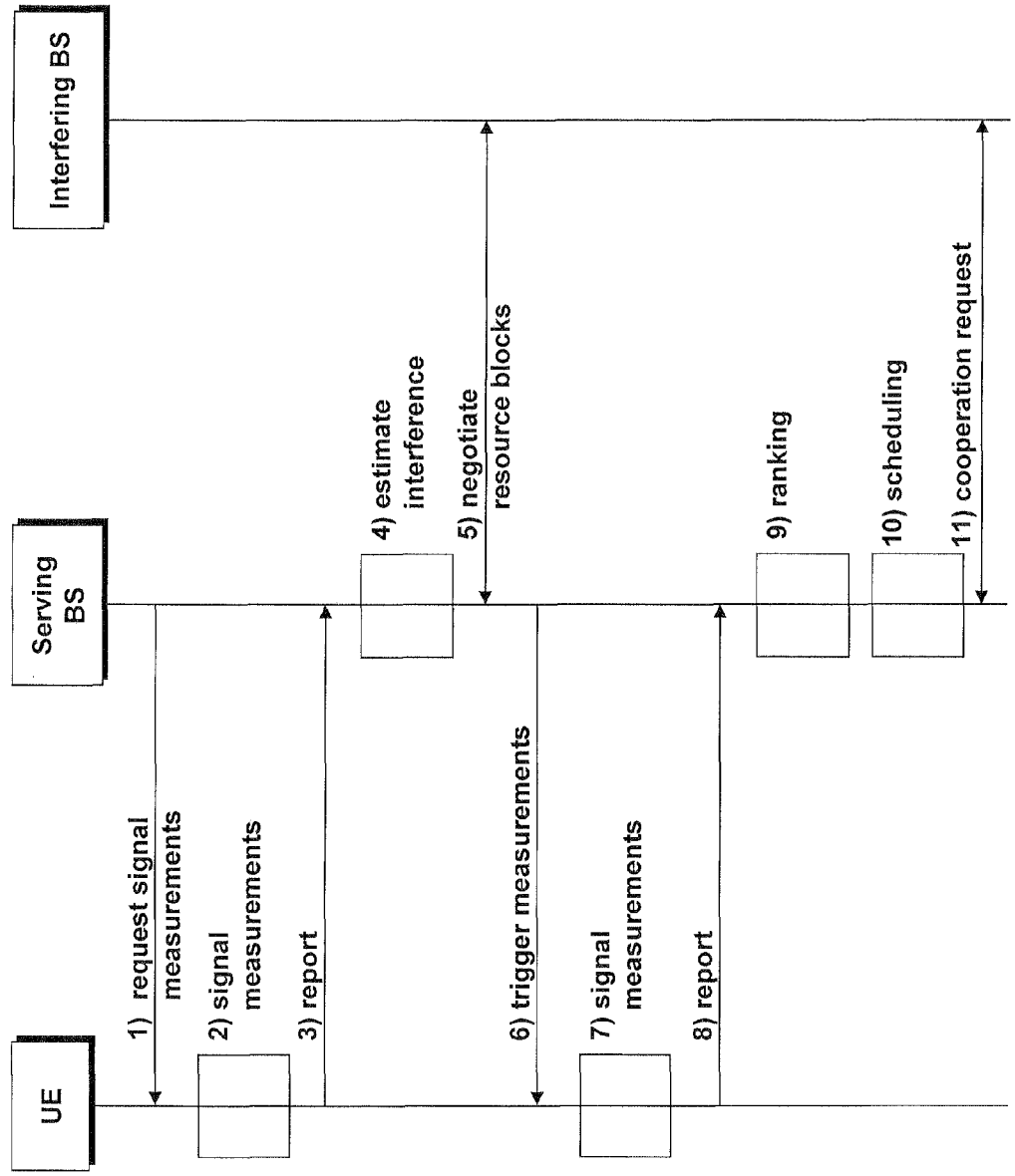
FIG. 2 shows a message exchange between a serving base station, an interfering base station and the user equipment to reduce interference at the user equipment.

The present invention can help to determine and reduce the interference level at the user equipment 100 of signals generated by the interfering base station/transceiver node 200 as will be explained in further detail below. The interfering transceiver node preferably contains correlated transmitter antennas e.g. two antenna elements able to build different radiation patterns or other means to emit defined radiation patterns. In FIG. 2 a diagram shows in more detail how a serving base station can operate to determine and/or minimize the interference generated at the user equipment from the transmission of the interfering base station or, in other terms, transceiver node. To this end the power of the main interfering transceiver node received at a user equipment is estimated using existing user equipment measurements. In a first step, the serving base station requests user equipment signal measurements. In a cellular system basic measurements are performed by the user equipment, e.g. for mobility purposes. In the second step shown in FIG. 2 the user equipment carries out the signal measurements. One possibility to identify an interfering base station is the reference signal received power RSRP, which is defined as the linear average over the power contributions (in Watt) of the resource elements that carry cell-specific reference signals within the considered measurement frequency bandwidth. Furthermore, it is possible to use a reference signal received quality (RSRQ) which is defined as the ratio NxRSRP/(E-UTRA carrier RSSI), where N is the number of resource blocks of the E-UTRA carrier RSSI measurement bandwidth, RSSI being the received signal strengths indicator. The measurements in the numerator and denominator shall be made over the same set of resource blocks.

E-UTRA carrier received signal strength indicator (RSSI), comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc.

E-UTRA carrier RSSI, later called RSSI, is the aggregation of useful Rx signal power, interference+noise power. The useful Rx signal power can be estimated by the serving transceiver node and subtracted from RSSI to obtain an estimate of the interference+noise power. We consider UEs that experience interference scenarios that are specific to heterogeneous deployment as described in FIG. 1. For these UEs, a single interfering BS causes the major part of the interference+noise power component of RSSI. Therefore, from RSRP and RSRQ measurements of these UEs, its serving BS deduces RSSI and from RSSI the order of magnitude of the interference coming from the main interfering BS can estimated.

Thus, in other words, the signal measurements triggered by the serving base station with the request step 1 may measure one or both of the following signal parameters, the reference signal received power RSRP and the reference signal received quality RSRQ. The signal measurements may comprise or represent any suitable measurement of the strength of the received signal or any value determined based on such a measurement. The invention is not limited to the given example of RSRP or RSRQ.

Preferably, the interference level is estimated by the serving transceiver node/base station by determining the received signal strengths indicated, RSSI, from the signal parameters RSRP or RSRQ and by deducing from the RSSI an order of magnitude of the interference originating from the interfering transceiver node.

Referring back to FIG. 2, the signal measurements carried out in step 2 are reported to the serving base station (step 3), where the serving base station can now estimate the interference level at the user equipment originating from an interfering base station.

A serving base station typically serves a plurality of user equipments. The signal measurements carried out in step 2 may be carried out by all of the user equipments served by the serving base station or by a plurality of them. In step 4, it is possible to identify the user equipment that is subjected to a high interference level. This means that, according to a preferred embodiment, the user equipment experiencing interference is identified together with the interfering transceiver node before a transmission of a sequence of defined radiation patterns can be triggered by the serving base station. Preferably the interference level is estimated using the signals received by the user equipment and transmitted to the serving base station.

Steps 1 to 4 can be used to identify the user equipments that are in a critical interference situation (e.g. low carrier signal strength in combination with high Rx interfering power). For this purpose the RSRP measurements for both the serving and interfering nodes are sufficient. It is not necessary for steps 1 to 4 to measure the exact interference level, but the measured RSRP for the serving base station and the measured RSRP for the interfering base station are compared. With that comparison UEs that are in a critical interference situation can be identified.

One possibility to generate the different radiation patterns is the use of different precoding matrices using codebook-based beam forming. However, the invention is not limited to the use of precoding matrices. The different radiation patterns may be generated in any other way allowing the transceiver node to emit defined radiation patterns. After the user equipment experiencing strong interference from a single transceiver node is identified in step 4, the serving base station serving said user equipment negotiates in step 5 with the interfering transceiver node transmission resource blocks (RBs), e.g. in a specific time and frequency interval, in which the interfering base station uses a particular precoding matrix, also named PMI, for its transmission. All predefined precoding matrices within a codebook of the serving transceiver node should be used at least once. This is also called a PMI cycle procedure, which will be discussed in further detail with reference to FIG. 5 further below. This step 5 need not be a negotiation step. The purpose of this step is to define when the interfering base station will cycle through the different radiation patterns. Thus step 5 can also be a simple order to use the resource blocks as indicated by the serving base station.

This means, in other words, that, in the method for measuring the signal interference, time and frequency resource blocks are negotiated with the interfering transceiver node, the resource blocks in which the interfering transceiver node uses different precoding matrices for signal transmission.

Preferably, all precoding matrices of the serving transceiver node are used at least once.

When an agreement upon the resource blocks has been achieved between the serving transceiver node and the interfering transceiver node, signal measurements are triggered at the user equipment (step 6). The serving transceiver node informs the user equipment to again carry out signal measurements in the negotiated time and frequency resource blocks. Thus, the step of triggering signal measurements may comprise the step of triggering signal measurements in the negotiated time and frequency resource blocks.

In step 7 of FIG. 2 the user equipment carries out the signal measurements in the time and frequency resource blocks provided by the serving base station/transceiver node. The triggered signal measurements can contain the RSRP and RSRQ measurements as discussed above, these measurements being carried out in the negotiated time-frequency resource blocks. RSRP/RSRQ measurements usually first go through filtering steps at the user equipment before they are transmitted to the serving base station. The serving base station therefore timely informs the user equipment about the filter parameters to be used for the triggered RSRP and RSRQ measurement reports. The filter parameters can be transmitted in step 6 together with the negotiated resource blocks. In other words the method of measuring a signal interference may furthermore comprise the step of informing the user equipment about filter parameters to be used by the user equipment for the triggered signal measurements.

In step 8 shown in FIG. 2, the signal measurements are then reported to the serving base station. After receiving the measurement reports from the user equipment for all negotiated time and frequency resource blocks the serving transceiver node knows RSRP and RSRQ for each precoding matrix. The serving transceiver node can thus use an estimate of the interference level perceived by the selected user equipment for each precoding matrix, as was discussed above, using RSSI from which an order of magnitude of the interference can be estimated.

The serving base station can then determine a ranking of the precoding matrices (step 9). This means that the precoding matrices can be ordered according to the interference induced at the user equipment. This ordering or ranking is especially valid if the conditions in which each measurement was carried out were similar. This situation may be obtained e.g. with an interfering base station using correlated transmitter antennas.

With the ordering of the precoding matrices according to the corresponding interference level, the serving base station can build a set Li, the set Li containing the i precoding matrices creating the largest interference to the selected user equipment and a set Sj, the set Sj containing the j precoding matrices creating the smallest interference to the selected user equipment.

After the ranking, the serving base station can take its scheduling decisions (step 10), meaning that a scheduler in the serving base station determines in which time and frequency source blocks information is transmitted to the user equipment. After this scheduling step 10, the serving base station can send a cooperation request to the interfering base station. This cooperation request can be of two different natures but in both cases the message can contain a group of precoding matrices and the allocated resource blocks. In a first variant, the serving base station may request that the interfering base station avoid the precoding matrix present in Li for its transmission in the resource blocks scheduled to the selected user. In the second variant, the serving base station may request that the interfering base station use precoding matrices present in Sj for its transmission in the resource blocks scheduled to the selected user. In both variants, the interference reduction is ensured. In other words, the method for measuring and optimizing signal interference may comprise the step of transmitting a cooperation request to the interfering transceiver node containing information about radiation patterns, allowing the interfering transceiver node signal transmission with reduced interference at the user equipment. The radiation patterns can be obtained with the use of different precoding matrices. However, the interfering base station may generate the radiation patterns in any other way without the use of precoding matrices, e.g. with the use of mechanical shielding elements influencing the radiation pattern of the interfering transceiver node. Preferably, the cooperation request transmitted in step 11 comprises information about radiation patterns to be used or to be avoided by the interfering transceiver node for signal transmission.

Figure 5:
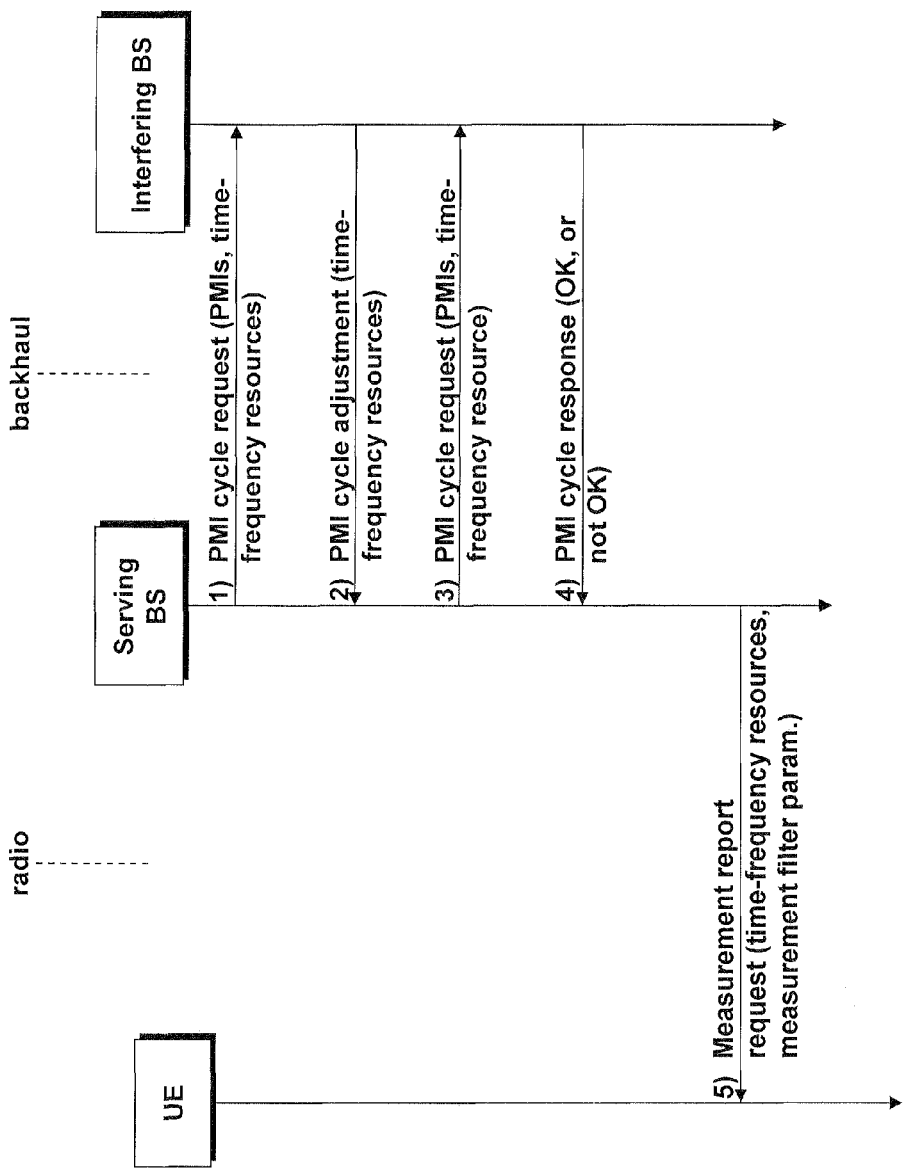
FIG. 5 shows a message exchange of the negotiation of a sequence of precoding matrices to be used by the interfering transceiver node for signal transmission.

The negotiation step shown step 5 of FIG. 2 is explained in more detail in FIG. 5. As shown in FIG. 5, the serving base station sends a PMI cycle request message to the interfering base station mentioning in which time and frequency resources the precoding matrices (PMIs) should be used for downlink transmission. In the second step shown in FIG. 5 the interfering base station may then send an adjustment message to propose different time and frequency resources. In that case, the serving base station can send, in step 3, an updated request taking into account the suggested time and frequency resources. In step 4, the interfering base station can finally accept or reject the PMI cycle procedure. If the interfering base station accepts the PMI cycle request procedure, the measurement report request can be transmitted to the user equipment containing the information about the time-frequency resources and the measurement filter parameters. This step 5 of FIG. 5 is part of step 6 shown in FIG. 2.

Summarizing, the negotiation step may comprise the step of transmitting a request message for a precoding matrices cycle to the interfering transceiver node and the step of receiving an accept message for the precoding matrices cycle from the interfering transceiver node. In another embodiment the method may furthermore comprise the step of receiving an adjustment message from the interfering transceiver node in response to the request message in which different time and frequency resource blocks are proposed for signal transmission, the serving base station transmitting an updated request message for a precoding matrices cycle to the interfering transceiver node.

Figure 6:
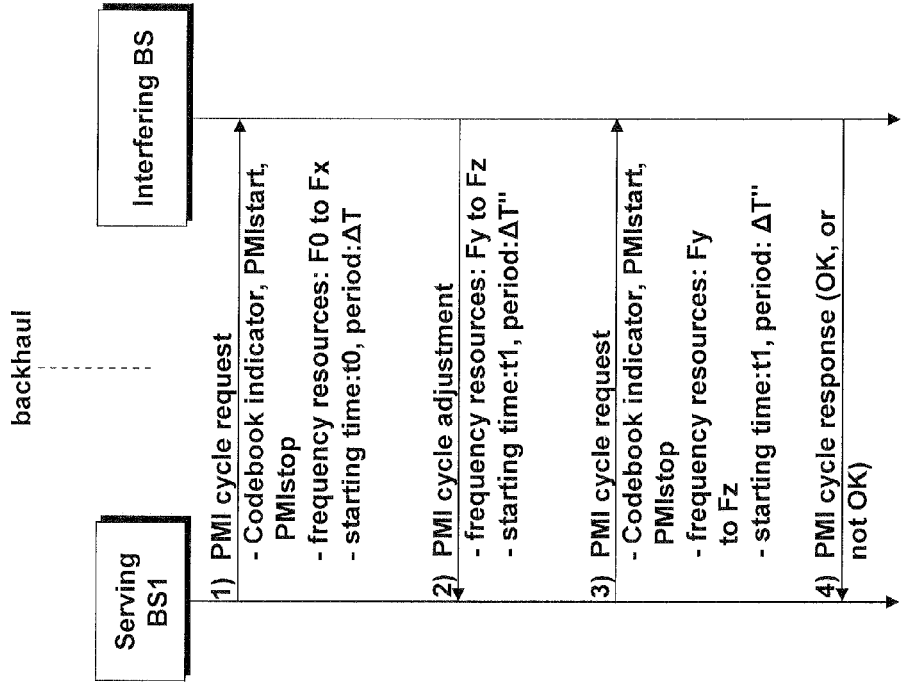
FIG. 6 shows an example of the messages exchanged between the serving base station and the interfering base station agreeing on precoding matrices to be used by the interfering base station for signal transmission.

An example of the negotiation process with more concrete messages is given in FIG. 6. In the first step where the PMI cycle request message is transmitted to the interfering base station the serving base station may include the starting time where the interfering base station should use the first indicated precoding matrix of the mentioned codebook, the time period after which the interfering base station should use the next precoding matrix in the codebook and the index of the final precoding matrix to be used. In a PMI cycle adjustment message from the interfering base station to the serving base station, the interfering base station may propose an alternative starting time, time period and frequency resources. In step 3, the serving base station may then send a new PMI cycle request message, including a new starting time, a new time period and additionally containing the index of the final precoding matrix to be used. In step 4, the interfering base station may transmit back the final cycle response message.

The output of this negotiation could, for example, be that the interfering base station uses every $\Delta T''=20$ ms in the frequency resources corresponding to the subband from Fy to Fz a different precoding matrix within the codebook, starting at time t1 with the precoding matrix with the smallest index and going up to the last precoding matrix of the codebook. As can be seen from the above, according to a preferred embodiment, the step of triggering the transmission of the sequence of the defined radiation patterns may include information about a starting time for the interfering transceiver node to use a first precoding matrix, a time period after which the next precoding matrix is to be used and an index of the final precoding matrix.

With the method steps shown in FIG. 2 the interference level at the base station can be estimated without a new or additional feedback from the user equipment to the serving and/or to the interfering base station.

Figure 7:
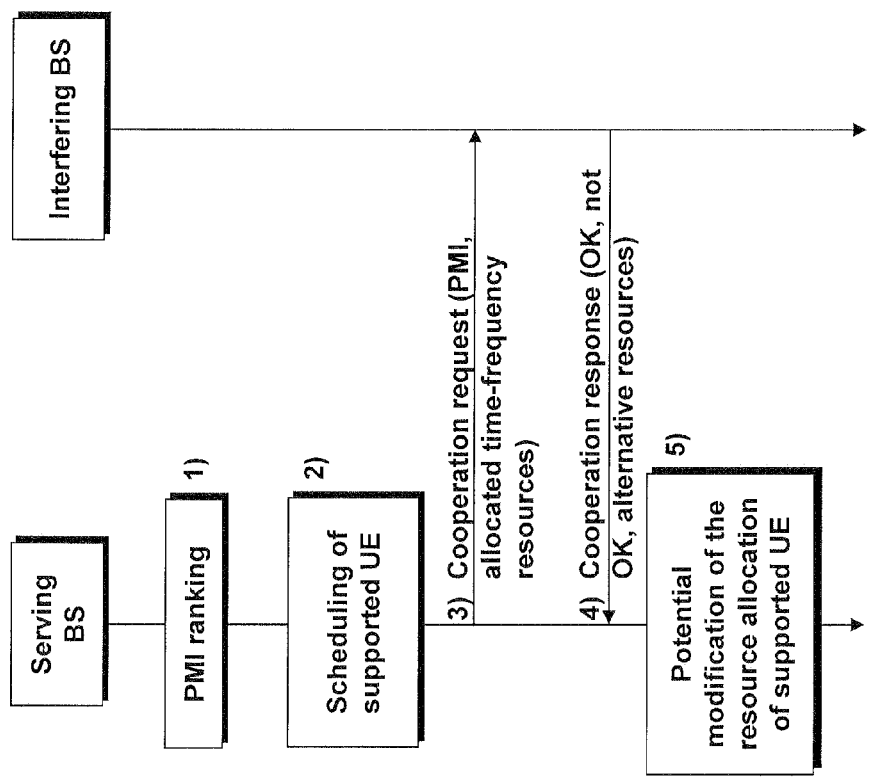
FIG. 7 shows the exchanged messages for setting up a cooperation of the serving base station and the interfering base station allowing a reduction of interference at the user equipment.

In FIG. 7, the message exchange between the serving base station and the interfering base station setting up a cooperative transmission is shown in more detail. After the PMI ranking, as already discussed in connection with FIG. 2 and the scheduling steps 9 and 10 of FIG. 2 corresponding to steps 1 and 2 of FIG. 7, a cooperation request is transmitted to the interfering base station. As discussed above, this cooperation request can contain the precoding matrices to be used by the interfering base station or to be avoided by the interfering base station (step 3). In step 4, the interfering base station can send the cooperation response indicating that it will or will not follow the PMI usage instructions as given by the serving base station. If the serving base station receives a cooperation reject from the interfering base station, it may decide to change the resource allocation of the selected or supported user equipment (step 5). The cooperation response in step 4 may contain alternative resources that help the serving base station to reschedule the supported user equipment in a beneficial way.

Figure 3:
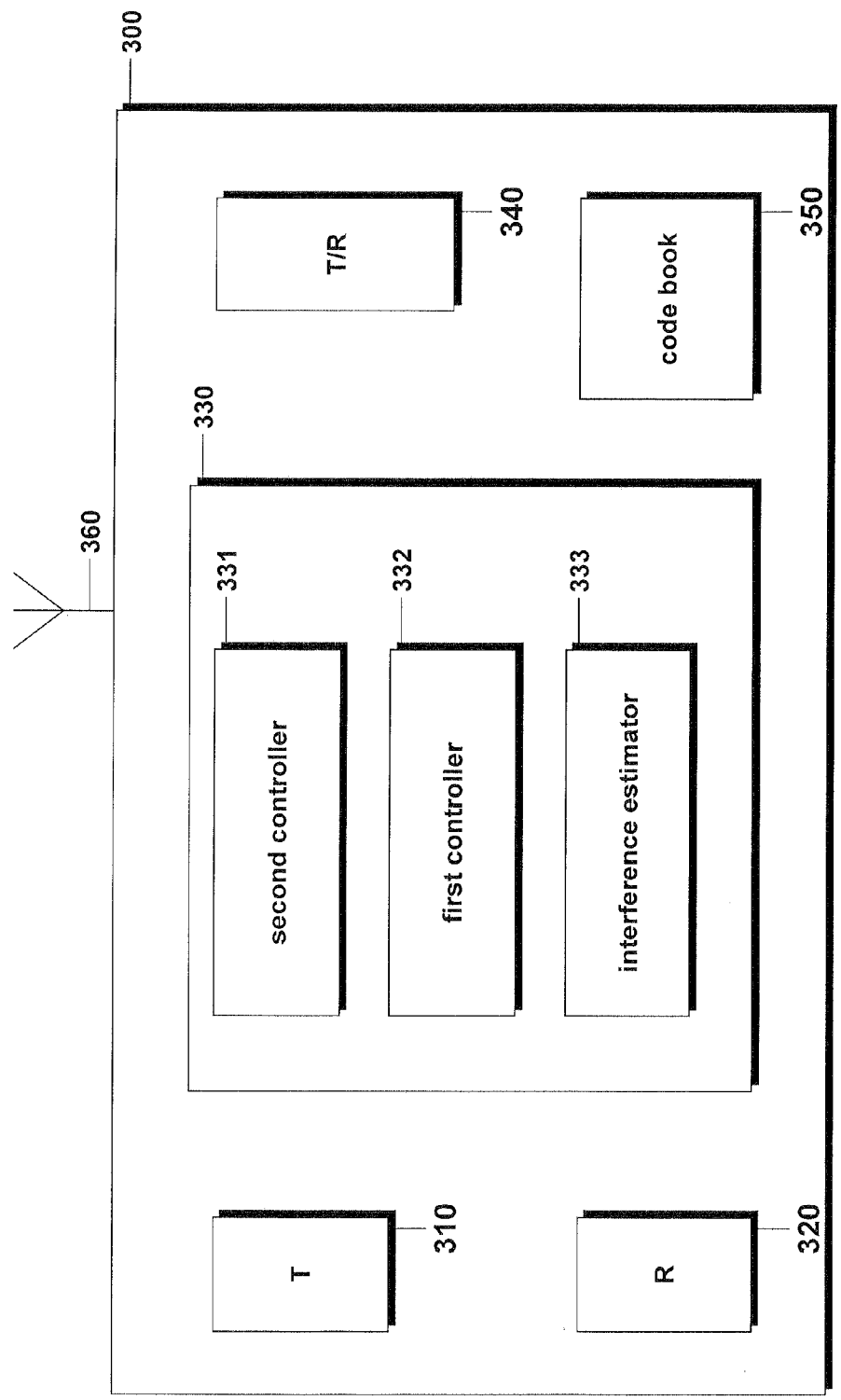
FIG. 3 shows a schematic view of the serving base station estimating an interference level of signals received at the user equipment shown in FIG. 1.
Figure 4:
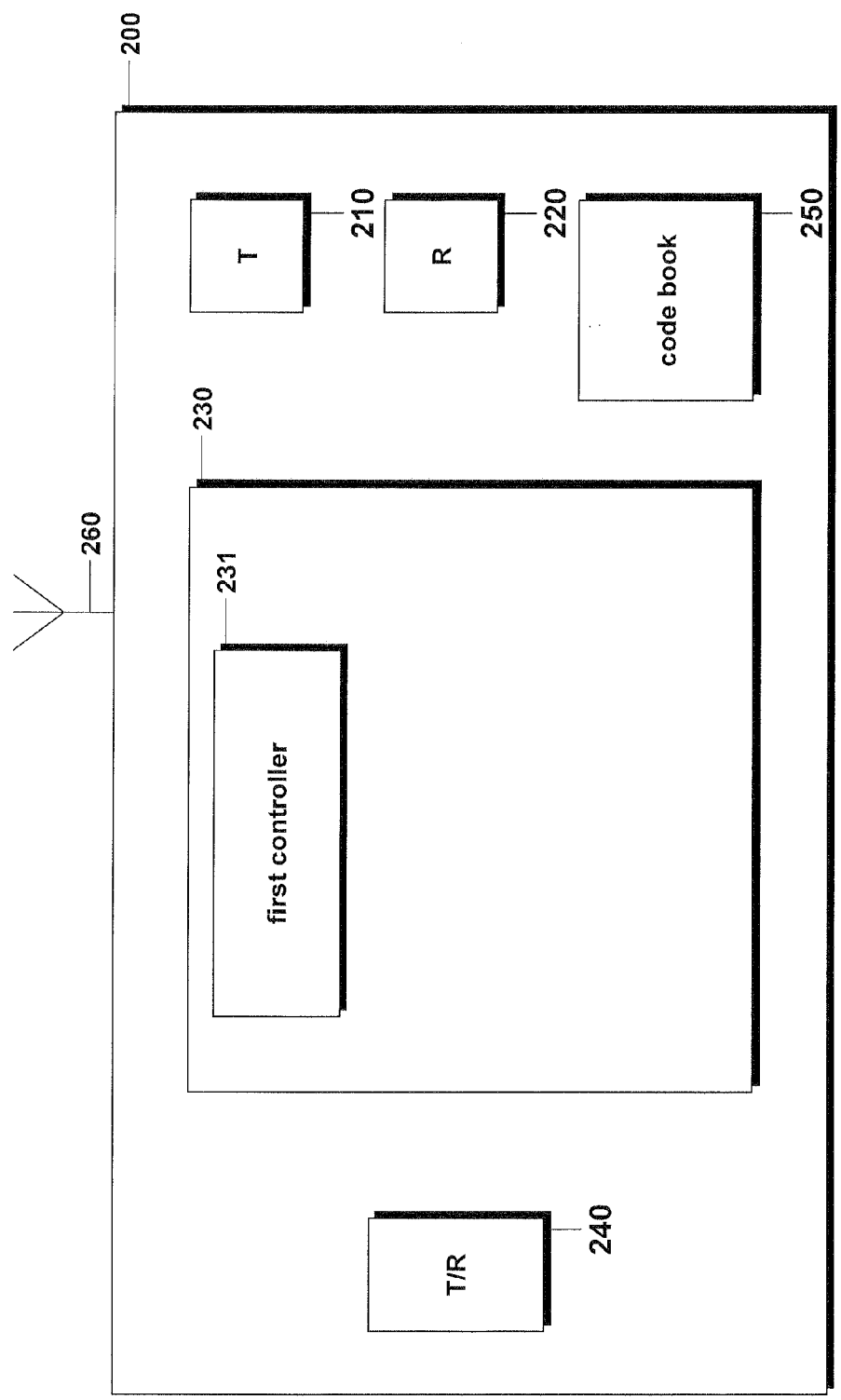
FIG. 4 shows a schematic view of the interfering base station shown in FIG. 1.

In FIGS. 3 and 4 the two transceiver nodes, the interfering transceiver node (FIG. 4) and the serving transceiver node (FIG. 3) are shown in more detail. It should be understood, that in the embodiments shown, not all components of the transceiver nodes are shown, but only the components that are helpful for the understanding of the present invention. Additionally, the different separate units shown in the schematic figures need not be incorporated in the design shown. The functional entities shown may be contained in less or more entities and the functional entities may be incorporated by a software or hardware or by a combination of software and hardware. In FIG. 3, the serving transceiver node is shown in further detail, the serving transceiver node 300 comprising a transmitter 310 for transmitting signals to the user equipment and a receiver 320 where signals from the user equipment are received. Additionally, a processing unit 330 can be provided, comprising a first controller 332 triggering the transmission of the sequence of the defined radiation patterns by the interfering transceiver node. To this end, the first controller may, as discussed above in further detail in connection with FIGS. 2 and 5-7, rank the precoding matrices used by the interfering base station in view of the interference level measured at the user equipment. The triggering of the transmission of the sequence of defined radiation patterns can comprise the step of negotiating the sequence of precoding matrices to be used by the interfering transceiver node for signal transmission.

Additionally, a second controller 331 may be provided that triggers the signal measurements at the user equipment of the signals transmitted by the interfering transceiver node that uses the negotiated sequence precoding matrices. The interference estimate 333 can then be used to estimate the interference level in dependence on the radiation patterns used by the interfering base station. It should be understood that the first and the second controller can be incorporated into the same physical entity.

The serving base station furthermore comprises a transceiver 340 for exchanging signals with other networks components such as the interfering base station 200. The transceiver node 300 may furthermore comprise a storage unit 350 storing the codebook, where the different precoding matrices used by the serving transceiver node for signal transmission are provided.

A serving transceiver node comprises an antenna symbolized by reference numeral 360 for signal transmission.

The interfering transceiver node shown in FIG. 4 can comprise a transmitter 210, for transmitting signals inter alia to the user equipment 100, and a receiver 220, for receiving signals from the user equipment. The transceiver node furthermore comprises a processing unit 230 comprising a first controller 231 receiving the request from the serving transceiver node for transmitting the sequence of the defined radiation patterns using the antenna or antennas symbolized by reference numeral 260.

The transceiver node 200 furthermore comprises a transceiver module 240 for exchanging information with other network nodes such as the serving transceiver node 300.

It should be understood that, in another situation, the interfering transceiver node 200 can be the serving transceiver node for another user equipment. In this case it additionally contains the units discussed above in connection with FIG. 3. The transceiver node furthermore comprises a data storage unit 250 for storing codebooks to be used by the interfering transceiver node for signal transmission. The precoding matrices received from the serving transceiver node may be stored in this database 250.

Summarizing, according to one embodiment, the invention allows the application of codebook-based coordinated beam forming in heterogeneous deployments of an FDD based cellular system by using existing user equipment measurements defined for mobility purpose. No new user equipment measurements are required. Furthermore, a feedback from the user equipment to the interfering base station is not necessary. With the combination of a negotiating phase and the subsequent triggering of signal measurements at the user equipment a serving base station can associate the measurements with the corresponding radiation patterns generated by the interfering transceiver node. The information can then be used as an input for a selection of precoding matrices.

The invention claimed is:

1. A method for measuring signal interference from an interfering transceiver node of a mobile communications network to a user equipment served by a serving transceiver node, the interfering transceiver node using a plurality of defined radiation patterns for signal transmission, the method comprising the steps of:
    triggering, by the serving transceiver node, a transmission of a sequence of the defined radiation patterns by the interfering transceiver node,
    triggering, by the serving transceiver node, signal measurements at the user equipment of signals transmitted by the interfering transceiver node that uses the sequence of the defined radiation patterns, and
    estimating, by the serving transceiver node, an interference level of the signals received at the user equipment from the interfering transceiver node in dependence on the sequence of the defined radiation patterns, wherein the interference level is estimated based on the triggered signal measurements received from the user equipment.

2. The method according to claim 1, further comprising the step of transmitting, by the serving transceiver node, a cooperation request to the interfering transceiver node indicating radiation patterns selected based on said step of estimating.

3. The method according to claim 1, further comprising the step of negotiating, by the serving transceiver node, with the interfering transceiver node transmission resource blocks, in which the interfering transceiver node uses the defined radiation patterns for signal transmission.

4. The method according to claim 3, wherein the step of triggering signal measurements comprises the step of triggering signal measurements in the negotiated transmission resource blocks.

5. The method according to claim 1, wherein the defined radiation patterns are generated using different precoding matrices.

6. The method according to claim 5, wherein for generating the sequence of the defined radiation patterns all precoding matrices of the serving transceiver node are used at least once.

7. The method according to claim 3, wherein the negotiating step comprises the steps of:
transmitting a request message for a precoding matrices cycle to the interfering transceiver node, and
receiving an accept message for a precoding matrices cycle from the interfering transceiver node.

8. The method according to claim 7, further comprising the steps of:
receiving, by the serving transceiver node, an adjustment message from the interfering transceiver node in response to the request message in which different transmission resource blocks are proposed for signal transmission, and
transmitting, by the serving transceiver node, an updated request message for a precoding matrices cycle to the interfering transceiver node.

9. The method according to claim 1, further comprising the step of identifying, by the serving transceiver node, the user equipment experiencing interference and the interfering transceiver node before transmission of the sequence of the defined radiation patterns is triggered by estimating an interference level of signals received by the user equipment.

10. The method according to claim 2, wherein the cooperation request indicates radiation patterns to be used or to be avoided by the interfering transceiver node for signal transmission.

11. The method according to claim 1, wherein the signal measurements measure at least one of the following signal parameters: a reference signal received power, RSRP, and a reference signal received quality, RSRQ.

12. The method according to claim 11, wherein the interference level is estimated by the serving transceiver node by determining a Received Signal Strength Indicator, RSSI, from the signal parameters RSRP and /or RSRQ and by deducing from the RSSI an order of magnitude of the interference originating from the interfering transceiver node.

13. The method according to claim 1, further comprising the step of informing, by the serving transceiver node, the user equipment about filter parameters to be used by the user equipment for the signal measurements.

14. The method according to claim 1, wherein the step of triggering the transmission of the sequence of the defined radiation patterns indicates at least one of a starting time for the interfering transceiver node to use a first precoding matrix, a time period after which the next precoding matrix is to be used and an index of a final precoding matrix.

15. A serving transceiver node for a mobile communications network, the serving transceiver node being for serving a user equipment which experiences interference from an interfering transceiver node, the interfering transceiver node using a plurality of defined radiation patterns for signal transmission, the serving transceiver node comprising:
a first controller for triggering a transmission of a sequence of the defined radiation patterns by the interfering transceiver node,
a second controller for triggering signal measurements at the user equipment of signals transmitted by the interfering transceiver node that uses the sequence of the defined radiation patterns, and
an interference estimator for estimating an interference level of the signals received at the user equipment from the interfering transceiver node, in dependence on the sequence of the defined radiation patterns, using the triggered signal measurements received from the user equipment.

16. The serving transceiver node according to claim 15, further comprising a transmitter for transmitting a cooperation request to the interfering transceiver node containing radiation patterns selected based on the estimated interference level.

17. The serving transceiver according to claim 15, wherein the interference estimator is configured for estimating an interference level at the user equipment by using a reference signal received power, RSRP, and/or a reference signal received quality, RSRQ, and by deducing an order of magnitude of the interference there from.

18. A method for transmitting signals from an interfering transceiver node of a mobile communications network to a user equipment served by a serving transceiver node, the interfering transceiver node using a plurality of defined radiation patterns for signal transmission, the method comprising the steps of:
receiving, by the interfering transceiver node, from the serving transceiver node, a request for transmitting a sequence of the defined radiation patterns, and
transmitting, by the interfering transceiver node, signals using the sequence of the defined radiation patterns.

19. The method according to claim 18, further comprising the step of receiving, by the interfering transceiver node, a cooperation request from the serving transceiver node containing information about radiation patterns allowing the interfering transceiver node a signal transmission with reduced interference at the user equipment.

20. An interfering transceiver node for a mobile communications network, the interfering transceiver node being for transmitting signals to a user equipment served by a serving transceiver node, the interfering transceiver node comprising:
at least one antenna for transmitting defined radiation patterns,
a first controller for receiving a request from the serving transceiver node for transmitting a sequence of the defined radiation patterns,
a transmitter for using said at least one antenna configured to transmit signals having the defined radiation patterns.

21. The interfering transceiver node according to claim 20, further comprising a receiver for receiving a cooperation request from the serving transceiver node containing information about radiation patterns allowing the interfering transceiver node a signal transmission with reduced interference at the user equipment.

* * * * *